US012749631B2

(12) United States Patent
Kadlec et al.

(10) Patent No.: US 12,749,631 B2
(45) Date of Patent: Sep. 29, 2026

(54) ELECTRICAL CONTACT SYSTEM WITH LIQUID METAL LAYER AND DIFFUSION BARRIER

(71) Applicant: EATON INTELLIGENT POWER LIMITED, Dublin (IE)

(72) Inventors: Stanislav Kadlec, Prague (CZ); Sandy Omar Jimenez, Coraopolis, PA (US); Christian Ruempler, Bonn (DE); Mykhailo Gnybida, Prague (CZ)

(73) Assignee: EATON INTELLIGENT POWER LIMITED, Dublin (IE)

( * ) Notice: Subject to any disclaimer, the term of this patent is extended or adjusted under 35 U.S.C. 154(b) by 264 days.

(21) Appl. No.: 18/290,891

(22) PCT Filed: Sep. 15, 2022

(86) PCT No.: PCT/EP2022/025433
§ 371 (c)(1),
(2) Date: Jan. 22, 2024

(87) PCT Pub. No.: WO2023/041198
PCT Pub. Date: Mar. 23, 2023

(65) Prior Publication Data

US 2024/0274373 A1 Aug. 15, 2024

Related U.S. Application Data

(60) Provisional application No. 63/244,348, filed on Sep. 15, 2021.

(51) Int. Cl.
*H01H 1/20* (2006.01)
*H01H 1/00* (2006.01)

(52) U.S. Cl.
CPC ............ *H01H 1/20* (2013.01); *H01H 1/0036* (2013.01); *H01H 2001/0057* (2013.01)

(58) Field of Classification Search
CPC .... H01H 50/54; H01H 53/08; H01H 2201/00; H01H 2201/022; H01H 2201/024;
(Continued)

(56) References Cited

U.S. PATENT DOCUMENTS

| | | | | |
|---|---|---|---|---|
| 4,804,932 | A | 2/1989 | Akanuma et al. | |
| 5,374,792 | A * | 12/1994 | Ghezzo | B29C 59/16 200/279 |

(Continued)

FOREIGN PATENT DOCUMENTS

| | | | | |
|---|---|---|---|---|
| DE | 26 52 506 | A1 | 5/1978 |
| EP | 1 045 419 | A1 | 10/2000 |
| GB | 2 052 871 | A | 1/1981 |

OTHER PUBLICATIONS

European Patent Office "International Search Report and Written Opinion" for corresponding International Application No. PCT/EP2022/025433, mailed Feb. 28, 2023, 13 pp.

*Primary Examiner* — Anthony R Jimenez
(74) *Attorney, Agent, or Firm* — Eckert Seamans Cherin & Mellott, LLC

(57) ABSTRACT

An electrical contact system includes a first contact, a first diffusion layer disposed on the first contact, a first liquid metal layer disposed on the first diffusion layer, a second contact, a second diffusion layer disposed on the second contact, and a second liquid metal layer disposed on the second diffusion layer.

15 Claims, 5 Drawing Sheets

(58) Field of Classification Search
CPC ....... H01H 2201/026; H01H 2201/028; H01H 2201/03; H01H 2203/036; H01H 2001/00; H01H 2001/0052; H01H 2001/0057; H01H 2001/0084; H01H 2001/02; H01H 2001/021; H01H 2001/22; H01H 29/00; H01H 29/006; H01H 29/02; H01H 29/04; H01H 29/06; H01H 29/12; H01H 1/00; H01H 1/02; H01H 1/0206; H01H 1/0025; H01H 1/21; H01H 1/20; H01H 1/036; H01H 1/04; H01H 1/22; H01H 1/226
USPC ........................................................ 200/16 A
See application file for complete search history.

(56) References Cited

U.S. PATENT DOCUMENTS 6,384,353 B1 * 5/2002 Huang ................ B81C 1/00301
335/78
7,276,991 B2 10/2007 Rubel
2011/0062003 A1 3/2011 Srinivasan

* cited by examiner

ELECTRICAL CONTACT SYSTEM WITH LIQUID METAL LAYER AND DIFFUSION BARRIER

CROSS REFERENCE TO RELATED APPLICATIONS

This patent application claims the priority benefit under 35 U.S.C. § 371 of International Patent Application No. PCT/EP2022/025433, filed Sep. 15, 2022, which claims priority to U.S. Provisional Application No. 63/244,348, filed Sep. 15, 2021, entitled "ELECTRICAL CONTACT SYSTEM WITH LIQUID METAL LAYER AND DIFFUSION BARRIER", the contents of each are incorporated by reference herein.

BACKGROUND

FIELD

The disclosed concept generally relates to electrical contacts. More particularly, the disclosed concept relates to electrical contacts for circuit interrupters or switching devices.

BACKGROUND INFORMATION

Standard circuit interruption or switching devices typically have contact resistance that limits the led through current (as in relays) or uses bulky contact solutions with high contact forces and relatively slow opening operations. Increasing the led through current and increasing the speed of opening operations are both desirable, but present challenges.

Thus, there is room for improvement in electrical contacts in circuit interrupters or switching devices.

SUMMARY

In accordance with an aspect of the disclosed concept, an electrical contact system comprises: a first contact; a first diffusion layer disposed on the first contact; a first liquid metal layer disposed on the first diffusion layer; a second contact; a second diffusion layer disposed on the second contact; and a second liquid metal layer disposed on the second diffusion layer.

In accordance with an aspect of the disclosed concept: a method of forming an electrical contact system comprises: providing a first contact; depositing a first diffusion layer on the first contact; depositing a first liquid metal layer on the first diffusion layer; providing a second contact; depositing a second diffusion layer on the second contact; and depositing a second liquid metal layer on the second diffusion layer.

In accordance with an aspect of the disclosed concept, an electrical contact system comprises: a first contact; a first diffusion layer disposed on the first contact; a first liquid metal layer disposed on the first diffusion layer; a second contact; a second diffusion layer disposed on the second contact; a second liquid metal layer disposed on the second diffusion layer; a crossbar having a first contact area disposed over at least a portion of the first contact and second contact area disposed over the second contact; a third diffusion layer disposed on the first contact area of the crossbar; a third liquid metal layer disposed on the third diffusion layer; a fourth diffusion layer disposed on the second contact area of the crossbar; and a fourth liquid metal layer disposed on the fourth diffusion layer.

BRIEF DESCRIPTION OF THE DRAWINGS

A full understanding of the disclosed concept can be gained from the following description of the preferred embodiments when read in conjunction with the accompanying drawings in which.

DETAILED DESCRIPTION OF PREFERRED EMBODIMENTS

Figure 1:
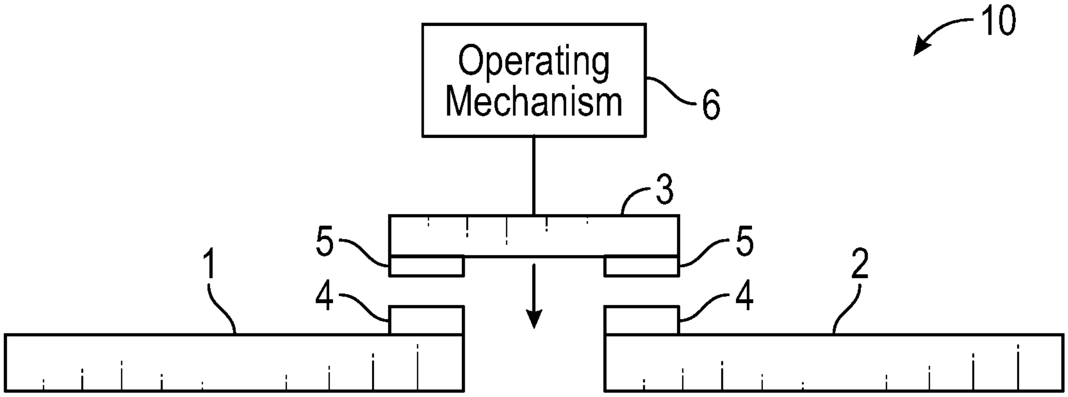
FIG. 1 is a schematic diagram of an electrical contact system for use in a circuit interrupter or switching device in accordance with an example embodiment of the disclosed concept.

Directional phrases used herein, such as, for example, left, right, front, back, top, bottom, and derivatives thereof, related to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the statement that two or more parts are "electrically coupled" or are in "electrical communication" shall mean that two or more parts or components are joined together either directly or joined through one or more intermediate parts such that electricity, current, voltage, and/or energy is operable to flow from one part or component to the other part or component, and vice-versa.

As employed herein, the singular form of "a", "an", and "the" include plural references unless the context clearly dictates otherwise.

In example embodiments of the disclosed concept, a new concept for electrical contacts is employed. The new concept can be applied with low forces and fast operation. One component of the new contacts is the application of a layer of liquid metal to the contacts. In some example embodiments, a diffusion barrier is applied between the liquid metal and the contact bulk. Some example embodiments of the disclosed concept will be described herein.

FIG. 1 is a schematic diagram of an electrical contact assembly 10 for use in a circuit interrupter or switching device in accordance with an example embodiment of the disclosed concept. The electrical contact assembly 10 includes contact bars 1,2. The contact bars 1,2 may be formed from copper (Cu). However, it will be appreciated that the contact bars 1,2 may be formed of other conducting materials without departing from the scope of the disclosed concept. In some example embodiments, the contact bars 1,2 may have a thickness of about 0.15 mm. However, it will be appreciated that other thicknesses may be employed without departing from the scope of the disclosed concept.

The electrical contact assembly 10 further includes a crossbar 3. The crossbar 3 may be formed of copper. The crossbar 3 is structured to extend across the contact bars 1,2 such that the crossbar 3 covers a portion of each contact bar 1,2. The crossbar 3 may be moved upward or downward by an operating mechanism 6. Moving the crossbar downward results in the crossbar 3 completing an electrical connection between the contact bars 1,2. Moving the crossbar 3 upward breaks that electrical connection. In some example embodiments, the crossbar 3 has a similar thickness as the contact bars 1,2. In some example embodiment, the crossbar 3 has a thickness of about 0.15 mm. However, it will be appreciated that other thicknesses may be employed without departing from the scope of the disclosed concept. The relatively small thickness of the crossbar 3 and/or the contact bars 1,2, in part, allows for the electrical contact assembly 10 to be small and light, and allows for low forces and fast operation. In some example embodiment, the crossbar 3 is structured to move from the open to the closed position, or vice versa, within a range of about 10 μs to about 200 μs.

The operating mechanism 6 may be any suitable mechanism for moving the crossbar 3 between open and closed positions. In some example embodiments of the disclosed concept, the operating mechanism 6 may be a micro electromechanical (MEM) electromagnetic or electrostatic actuator suitable for use in smaller devices such as some example embodiments of the contact bars 1,2 and crossbar 3.

In some example embodiments, contact areas of the contact bars 1,2 include a liquid metal layer 4. The liquid metal layer 4, in some embodiments, has a thickness within a range of about 1 μm to about 20 μm. However, it will be appreciated that other thicknesses may be employed without departing from the scope of the disclosed concept. In some example embodiments, corresponding contact areas of the crossbar 3 may also include a liquid metal layer 5. The liquid metal layer 5 of the crossbar 3 may have a similar thickness and composition as the liquid metal layer 4 of the contact bars 1,2.

The liquid metal layers 4,5 may be composed of conductive material that is in a liquid state at operation temperature, typically room or ambient temperature. In an example embodiment, the liquid metal layers 4,5 are composed of an alloy containing Gallium (Ga), Indium (In), and Tin (Sn). In an example embodiment, the liquid metal layers 4,5 are composed of Galinstan. Galinstan is a eutectic Ga—In—Sn alloy, which has a melting point of about −19° C. However, it will be appreciated that the particular liquid metal employed may be varied without departing from the scope of the disclosed concept.

The liquid metal layers 4,5 ensure high area, and in an optimal case the full area, contact between the contact areas of the contact bars 1,2 and the corresponding contact areas of the crossbar 3, lowering resistance and contact heating. In some example embodiments, this allows current through the electrical contact assembly 10 of up to 30A without contact overheating and damage.

In some example embodiments, the contact areas of the contact bars 1,2 and the crossbar 3 are sealed in a sealed gas-tight enclosure filled with appropriate gas or vacuum. In some example embodiment, the operating mechanism 6 is also sealed within the enclosure, but it will be appreciated that the operating mechanism 6 may be partially or fully disposed outside the enclosure.

Figure 2:
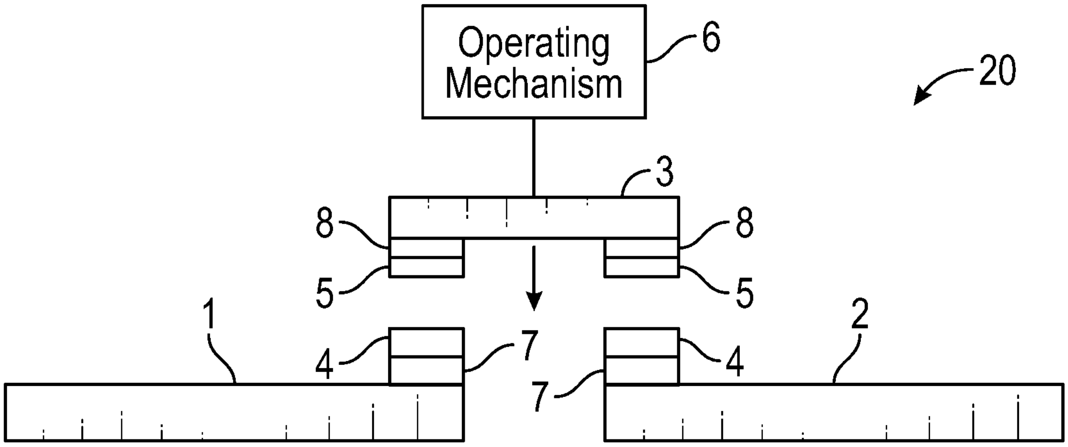
FIG. 2 is a schematic diagram of an electrical contact system for use in a circuit interrupter or switching device in accordance with another example embodiment of the disclosed concept.

FIG. 2 is a schematic diagram of an electrical contact assembly 20 in accordance with another example embodiment of the disclosed concept. The electrical contact assembly 20 of FIG. 2 differs from the electrical contact assembly 10 of FIG. 1 due to an addition of diffusion layers 7 between the contact bars 1,2 and the liquid metal layers 4, and, similarly, the addition of diffusion layers 8 between the crossbar 3 and the liquid metal layers 5. The addition of the diffusion layers 7,8 improve the long-term reliability of the electrical contact system 20.

The electrical contact assemblies 10,20 in use in circuit interrupters or switching devices may undergo thousands, and possibly up to a million switching operations, and may be subject to various ambient temperature conditions ranging from freezing winters to hot summers. In the electrical contact system 10, the contact between the liquid metal layers 4,5 and their corresponding contact bars 1,2 or crossbar 3, present the possibility of forming intermetallic compounds that could deteriorate the liquid metal layers 4,5, and thus deteriorate the performance of the electrical contact system 10. In some example embodiments, the liquid metal layers 4,5 are composed of a Ga—In—Sn alloy and the contact bars 1,2 and crossbar 3 are composed of copper. This can lead to the formation of intermetallic compounds of Ga and Cu such as $CuGa_2$ or $Cu_9Ga_4$ in the liquid metal layers 4,5, thus deteriorating the liquid metal layer 4,5 by increasing its melting temperature and thus and deteriorating the performance of the electrical contact system 10. The intermetallic layers are formed by diffusion, so either higher temperature or longer time may both contribute to the formation of the intermetallic compound. As an example of increased melting temperature, in a test system, the original melting point of a Ga—In—Sn alloy liquid metal layer was close to −19° C., but just after a few weeks of operation the melting point increased to about +10° C.

In the electrical contact system 20 of FIG. 2, diffusion layers 7 are added between the contact bars 1,2 and the liquid metal layers 4 and diffusion layers 8 are added between the crossbar 3 and the liquid metal layer 5. The diffusion layers 7,8 separate the bulk of the contact bars 1,2 or crossbar 3 from their corresponding liquid metal layers 4,5, and thus prevent formation of intermetallic compounds in the liquid metal layers 4,5.

In some example embodiments, the diffusion layers have a thickness within a range of about 10 nm to about 10 μm. However, it will be appreciated that different thicknesses may be employed without departing from the scope of the disclosed concept.

In some example embodiments, the diffusion layers 7,8 may be composed of Tungsten (W). However, it will be appreciated that the diffusion layers 7,8 may be composed of different materials without departing from the scope of the disclosed concept. Some examples of compositions for the diffusion layers 7,8 include the aforementioned Tungsten, Molybdenum (Mo), Tantalum (Ta), Titanium (Ti), a mixture of any of these elements, their conductive nitrides, or their conductive carbides. It will be appreciated that these examples are non-exhaustive and other compositions may be employed without departing from the scope of the disclosed concept.

In some example embodiments of the disclosed concept, the diffusion layers 7,8 may be a single layer. However, in some example embodiments, the diffusion layers 7,8 may be a multi-layered structure. For example, one layer of a diffusion layer may be composed of one composition and have a corresponding thickness, while another layer of the diffusion layer may have a different composition and corresponding thickness.

The diffusion layers 7,8 may be deposited on the contact bars 1,2 and crossbar 3 using any suitable method. In some example embodiments, the diffusion layers 7,8 may be deposited on the contact bars 1,2 and crossbar 3 by physical vapor deposition (e.g., without limitation, sputtering or evaporation), chemical vapor deposition, or by electroplating.

It will be appreciated that the electrical contact systems 10,20 may be employed in a variety of applications. In some example embodiments, the electrical contact systems 10,20 may be employed in hybrid circuit breakers. However, it will be appreciated that the disclosed concept is applicable to other devices such as non-hybrid circuit breakers, switching devices such as standard and reed relays, or other devices where electrical contacts are employed.

Figure 3:
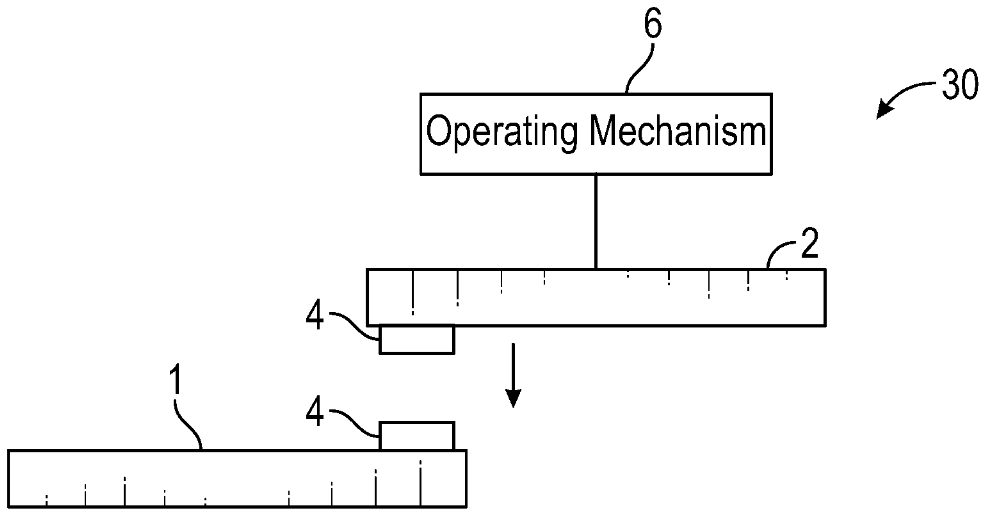
FIG. 3 is a schematic diagram of an electrical contact system for use in a circuit interrupter or switching device in accordance with another example embodiment of the disclosed concept.
Figure 4:
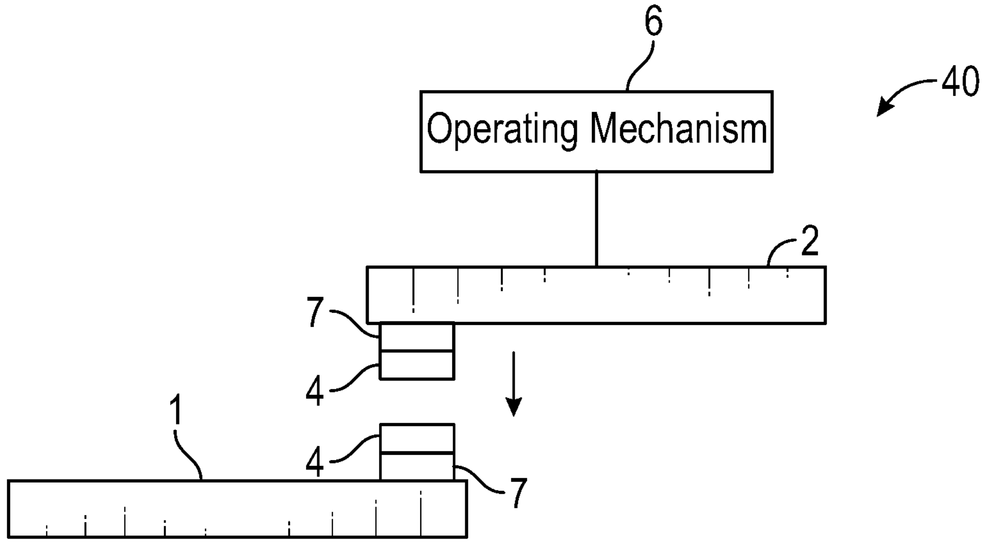
FIG. 4 is a schematic diagram of an electrical contact system for use in a circuit interrupter or switching device in accordance with another example embodiment of the disclosed concept.

While the example embodiments described herein include a crossbar, it will be appreciated that in some example embodiments, the crossbar may be omitted and the operating mechanism may instead cause the contact areas of the contact bars to come into contact and separate. Examples of such arrangements are shown in the electrical contact systems 30,40 of FIGS. 3 and 4, respectively. It will also be appreciated that other arrangements may be employed without departing from the scope of the disclosed concept.

Figure 5:
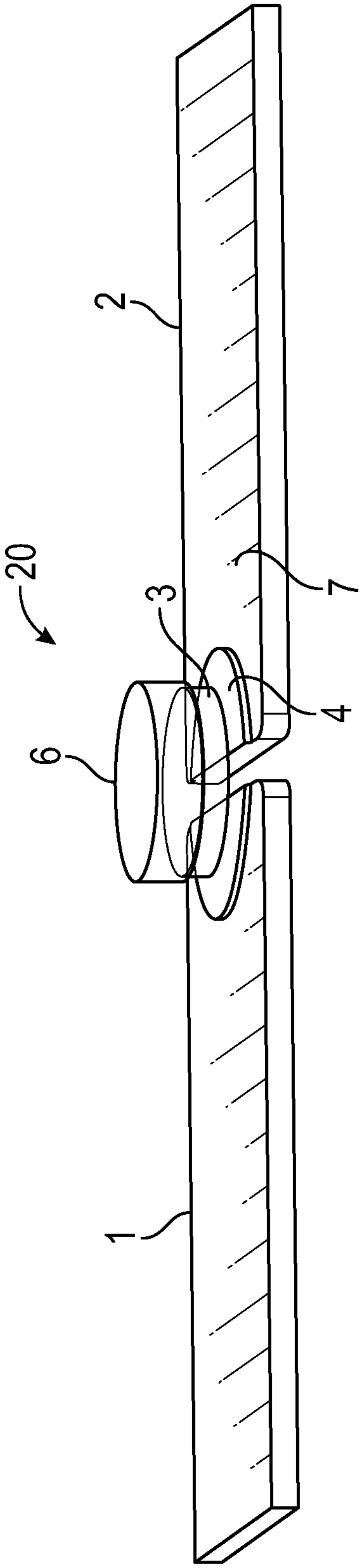
FIG. 5 is a schematic diagram of an electrical contact system for use in a circuit interrupter or switching device in accordance with another example embodiment of the disclosed concept.
Figure 6:
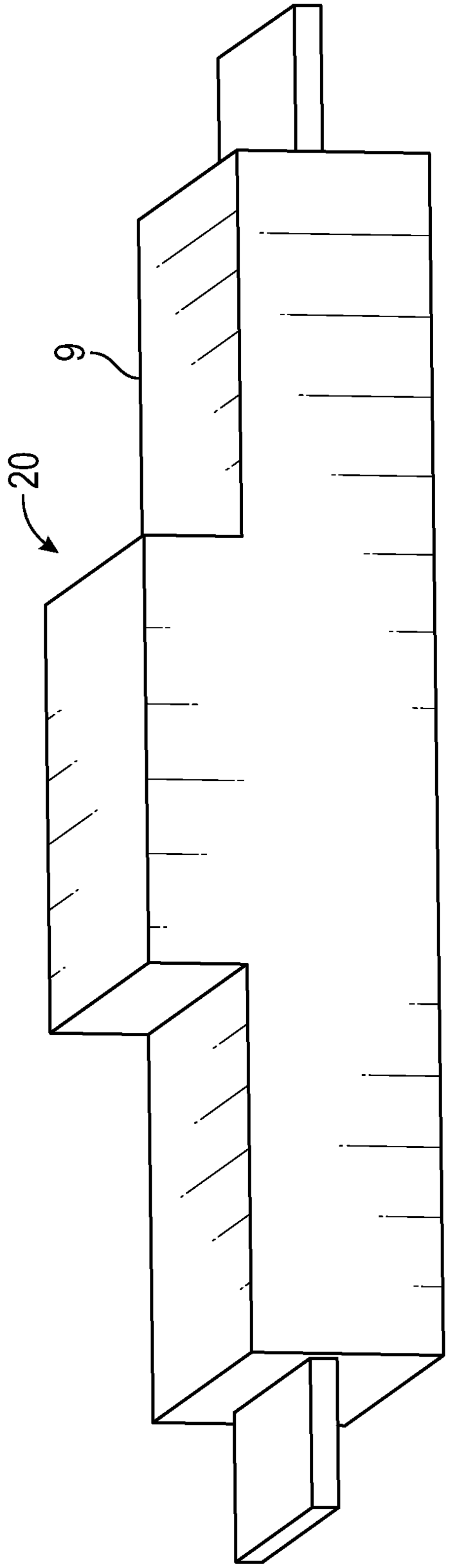
FIG. 6 is a schematic diagram of the electrical contact system of FIG. 5 including an enclosure in accordance with an example embodiment of the disclosed concept.
Figure 7:
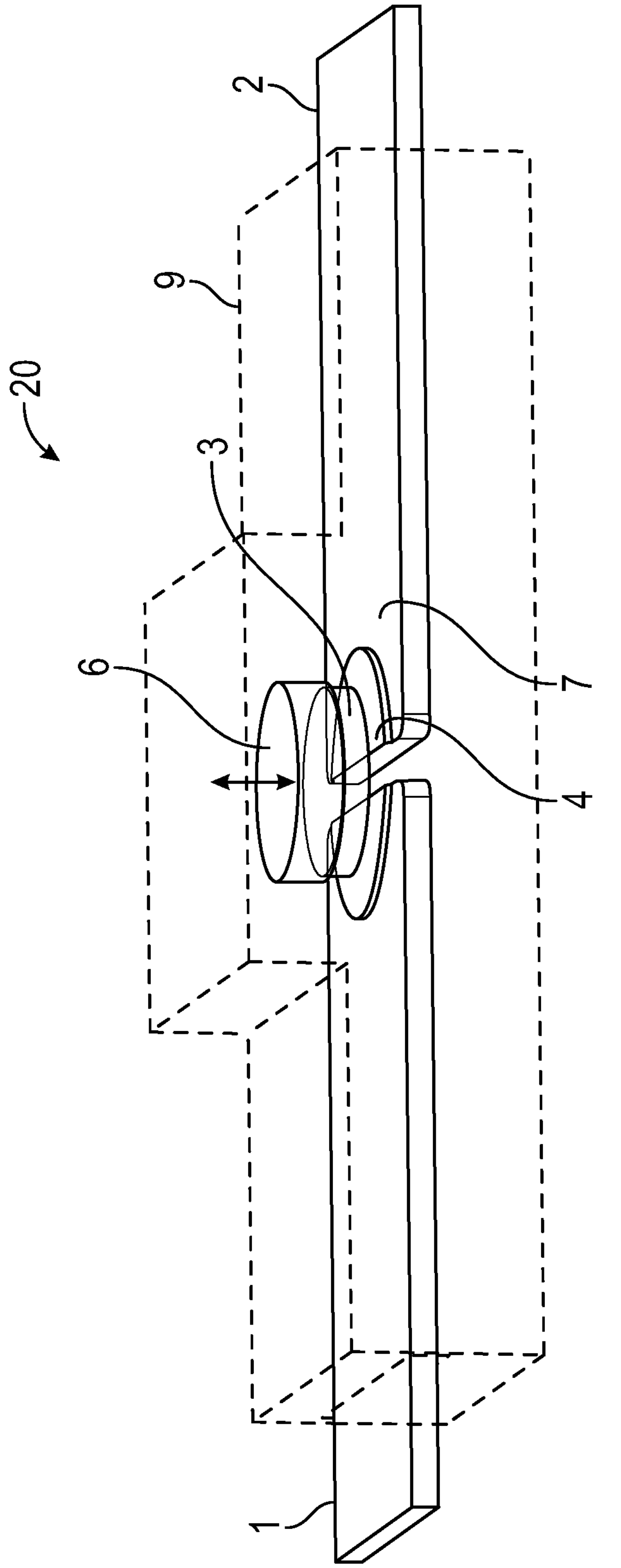
FIG. 7 is a schematic diagram of the electrical contact system of FIG. 6 showing components on the interior of the enclosure in accordance with an example embodiment of the disclosed concept.
Figure 8:
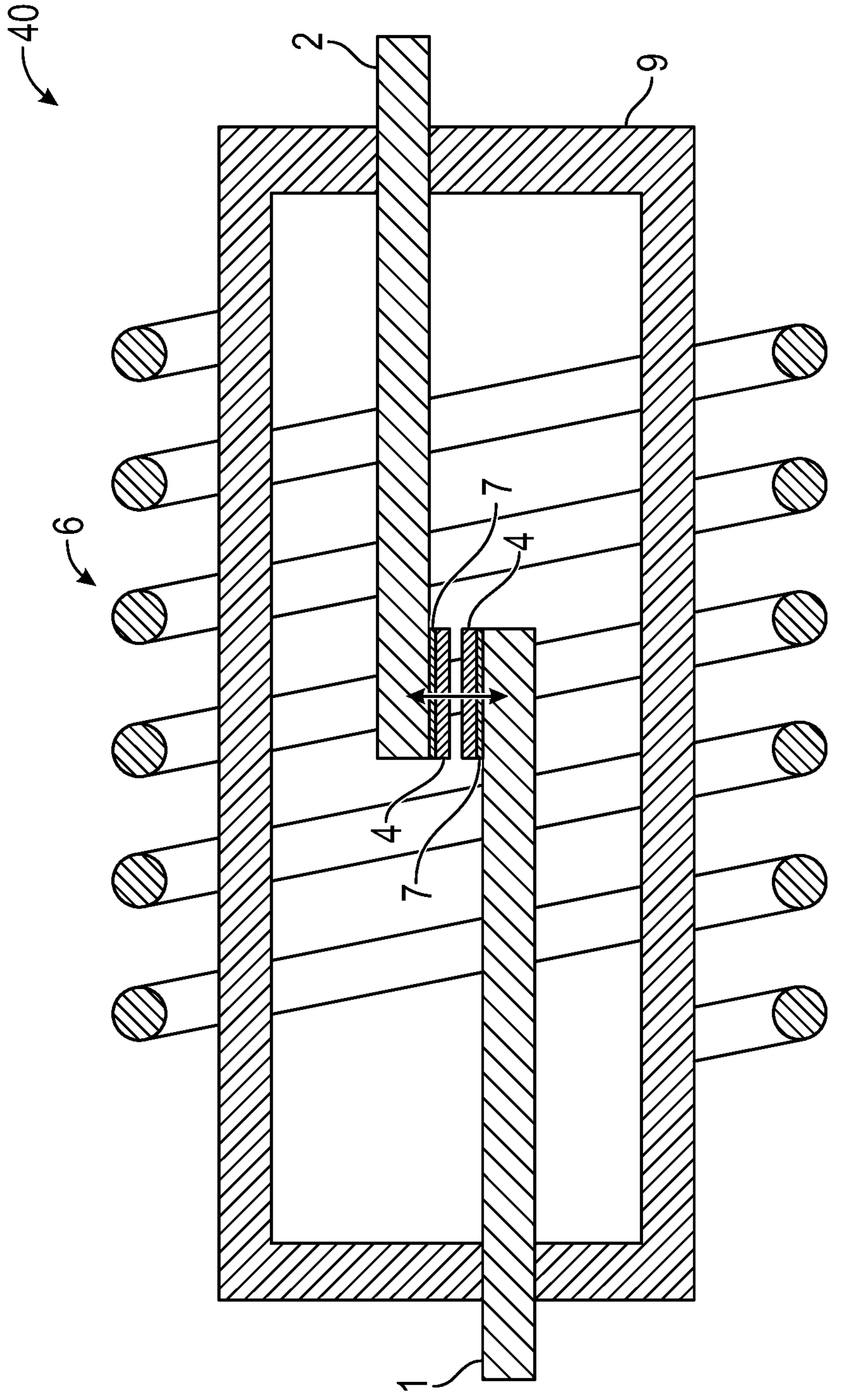
FIG. 8 is a schematic diagram of an electrical contact system for us in a circuit interrupter or switching device in accordance with another example embodiment of the disclosed concept.

FIGS. 5-8 provide some additional illustrations of example embodiments of electrical contact systems. For example, FIGS. 5-7 illustrate the electrical contact system 20. In the example shown in FIGS. 5-7, the operating mechanism 6 may be a conductive coil acting on a permanent magnet. Also shown in FIGS. 6 and 7 is an example of an enclosure 9 that may be used with the electrical contact system 20. FIG. 8 illustrates the electrical contact system 40 in which the operating mechanism 6 may be a conductive coil and the contact bars 1,2 may be reed contact bars. FIG. 8 also illustrates an example of an enclosure 8 that may be used with the electrical contact system 40. The particular arrangements shown in FIGS. 5-8 are examples of arrangements of electrical contact systems that may be used, but it will be appreciated that various modifications of such arrangements may be employed without departing from the scope of the disclosed concept.

It is noted that the figures are provided for an understanding of example embodiments of the disclosed concept and are not drawn to scale. In particular, thicknesses of the contact bars, crossbar, liquid metal layers, and diffusion layers are not drawn to, or intended to be drawn to scale.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An electrical contact system comprising:
- a first contact;
- a first diffusion layer disposed on the first contact;
- a first liquid metal layer disposed on the first diffusion layer;
- a second contact;
- a second diffusion layer disposed on the second contact; and
- a second liquid metal layer disposed on the second diffusion layer.

2. The electrical contact system of claim 1, wherein at least one of the first contact and the second contact are composed of copper.

3. The electrical contact system of claim 1, wherein at least one of the first contact and the second contact has a thickness of less than about 0.15 mm.

4. The electrical contact system of claim 1, wherein at least one of the first and second liquid metal layers is composed of an alloy including Gallium, Indium, and Tin.

5. The electrical contact system of claim 1, wherein at least one of the first and second diffusion layers has a thickness of less than about 10μm.

6. The electrical contact system of claim 1, wherein at least one of the first and second liquid metal layers has a thickness of less than about 20 μm.

7. The electrical contact system of claim 6, wherein at least one of the first and second diffusion layers is composed of Tungsten, Molybdenum, Tantalum, Titanium, their conductive nitrides, their conductive carbides, or any mixture thereof.

8. The electrical contact system of claim 1, further comprising:
- an operating mechanism structured to move the first contact against or away from the second contact.

9. The electrical contact system of claim 8, wherein the operating mechanism is structured to move the first contact against or away from the second contacts in less than about 200 μs.

10. A method of forming an electrical contact system comprising:
- providing a first contact;
- depositing a first diffusion layer on the first contact;
- depositing a first liquid metal layer on the first diffusion layer;
- providing a second contact;
- depositing a second diffusion layer on the second contact; and depositing a second liquid metal layer on the second diffusion layer.

11. An electrical contact system comprising:

a first contact;

a first diffusion layer disposed on the first contact;

a first liquid metal layer disposed on the first diffusion layer;

a second contact;

a second diffusion layer disposed on the second contact;

a second liquid metal layer disposed on the second diffusion layer;

a crossbar having a first contact area disposed over at least a portion of the first contact and second contact area disposed over the second contact;

a third diffusion layer disposed on the first contact area of the crossbar;

a third liquid metal layer disposed on the third diffusion layer;

a fourth diffusion layer disposed on the second contact area of the crossbar; and a fourth liquid metal layer disposed on the fourth diffusion layer.

12. The electrical contact system of claim 11, wherein at least one of the first contact, the second contact, and the crossbar are composed of copper.

13. The electrical contact system of claim 11, wherein at least one of the first contact, the second contact, and the crossbar has a thickness of less than about 0.15 mm.

14. The electrical contact system of claim 11, wherein at least one of the first, second, third, and fourth liquid metal layers is composed of an alloy including Gallium, Indium, and Tin.

15. The electrical contact system of claim 11, wherein at least one of the first, second, third, and fourth liquid metal layers has a thickness of less than about 20 μm.

* * * * *